United States Patent Office 3,816,547
Patented June 11, 1974

3,816,547
PROCESS FOR THE PRODUCTION OF
DIHYDROXYBENZENES
Efim Biller, Fribourg, Switzerland, Roman Goller, Burghausen, Germany, Richard Schlegel, Oberalm, Austria, and Hellmuth Pflugk, Wesseling, Germany, assignors to Union Rheinische Braunkohlen Kraftstoff Aktiengesellschaft, Wesseling, Germany
No Drawing. Filed Dec. 7, 1970, Ser. No. 95,900
Claims priority, application Germany, Dec. 8, 1969,
P 19 61 445.0
Int. Cl. C07c 37/02
U.S. Cl. 260—624 R     5 Claims

ABSTRACT OF THE DISCLOSURE

Hydrolyzing an aqueous solution of a chlorphenol with a stoichiometric amount of sodium hydroxide in the presence of a copper catalyst and a reducing agent, acidifying resulting reaction mixture and recovering dihydroxybenzene product.

---

This invention relates to a process for producing dihydroxybenzenes by hydrolyzing chlorphenols. More particularly, the present process, despite its relatively mild reaction conditions, obtains relatively high yields of desired product in relatively short times.

Those skilled in the art are familiar with the well known process of producing dihydroxybenzenes by catalytically hydrolyzing chlorophenols and bromophenols using alkali metal hydroxides as the hydrolyzing agent. Copper and copper salts have been employed as the catalysts. In the presence of copper or copper salts, at least five normal sodium hydroxide solution has been used in the hydrolysis of chlorophenols either with or without the addition of salts of alkaline earth metals. In the presence of copper or copper salts approximately four normal sodium hydroxide solutions have been employed in the hydrolysis of bromophenols.

The prior art is also familiar with the process wherein molten halophenols have been hydrolyzed under more or less anhydrous conditions. This procedure requires relatively high reaction temperatures, obtains relatively poor yields due to the formation of resinous materials and, as a result of isomerization, mainly, produces 1,3-dihydroxybenzenes.

It is also known in the prior art that dihydroxybenzenes can be formed from the corresponding dichlorobenzenes. Even in the presence of catalysts, this reaction requires temperatures of from 275 to 285° C. In this reaction, the influence of oxygen on the formation of resin-like by-products has been observed and the addition of substances with a reducing effect has consequently been proposed.

The present invention provides a process which hydrolyzes an aqueous solution of o-chlorophenol, lower alkyl substituted o-chlorophenol, p-chlorophenol, lower alkyl substituted p-chlorophenol or a mixture thereof at a concentration of 0.1 to 1 mol/liter with a stoichiometric amount of 0.2 to 3.5 normal sodium hydroxide solution in the presence of (a) 0.1 to 0.25 g./liter of dissolved copper as catalyst and (b) a reducing agent in an amount of from about 0.1 to 10 g./liter at a temperature of from 160 to 250° C., acidifies resulting reaction mixture and recovers dihydroxybenzene product.

Unexpectedly, the instant process despite its mild reaction conditions, permits hydrolysis to be carried out in relatively short reaction times, i.e., generally from 2 to 4 hours, in the absence of an activating or stabilizing substance such as a salt of an alkaline earth metal. Moreover, the instant process does not result in undesired isomerization of the product and only produces a limited amount of resin by-product.

Concentration of the chlorophenolate starting material of the instant invention should be from 0.1 to 1 mol/liter, preferably about 0.5 mol/liter. With higher concentrations, the conversion rates usually are lower and the formation of resinous deposits and secondary by-products is increased.

A 0.2 to 3.5 normal alkali metal hydroxide solution, preferably sodium hydroxide, should be used for hydrolysis. Concentrations in excess of four normal should be avoided. A 1.5 to 2.0 normal sodium hydroxide solution is especially preferred.

Copper, employed as catalyst, may be introduced into the solution in any manner. It may, for example, be employed either in the metallic form or in salt form. A most convenient method of introduction comprises utilizing the readily available copper sulphate. The copper content of the resulting solution should range from 0.1 to 0.25 g./liter, preferably from 0.15 to 0.17 g./liter.

The reaction vessel in which the process is carried out is preferably made of silver or of any other metal which is more noble than copper. Metals less noble than copper inactivate the aforesaid quantity of copper catalyst by reduction. Generally, it is also possible to carry out the reaction in a copper autoclave. However, corrosion occurs with certain alkylated phenol starting materials.

The most suitable temperature range for hydrolysis is from about 160 to about 250° C. At lower temperatures, conversions are too low. At higher temperatures, isomerization and dissociation into $CO_2$ occur to an increasing extent, especially at higher reactant concentrations.

The reducing agent should be added at the beginning of the reaction and should be present in an amount of from about 0.1 to 10 g./liter. Use of higher quantities of reducing agent should be avoided in order to prevent irreversible reduction of the catalyst. The identity of the reducing agent is not particularly critical. Sodium sulphite, sodium hydrogen sulphite and hydrazine sulphate are preferred. Sodium sulphite has been found to be particularly advantageous.

Lower alkyl substituted o-chlorophenols such as 3-methyl-, 6-methyl- and 4-tert.butyl-o-chlorophenol, as well as o-chlorophenol, can be used for hydrolysis and produce the corresponding pyrocatechol. Dihydroxy compounds such as resorcinol, hydroquinone and homopyrocatechol have a inhibiting effect on the function of the catalyst when they are present in relatively large quantities. Nevertheless, it is possible to hydrolyze p-chlorophenol or lower alkyl substituted p-chlorophenol which yield dihydroxy compounds having such an inhibiting effect, in high yields in admixture with o-chlorophenol or lower alkyl substituted o-chlorophenol, providing the former's concentration does not exceed about 25 to 30 mol percent. With higher concentrations, the mixture can only be hydrolyzed with lower conversion levels unless a compound which activates catalysis such as pyrocatechol, 3-methyl pyrocatechol or 3-tert.butyl pyrocatechol is added to the reaction mixture. When a catalysis activator of this kind is added, the stoichiometric amount (3 mols of sodium hydroxide per mol of total chlorophenol present) should generally not be increased unless dehalogenation of the starting compound to phenol or lower alkyl substituted phenol becomes more noticeable toward the end of the reaction as a result of the decreasing strength of alkali metal hydroxide present.

In some instances, it can prove advantageous to operate in the presence of a water-miscible solvent such as methanol. After acidification, the reaction mixture can be worked up as usual, preferably while excluding atmospheric oxygen. The reaction products are most advantageously extracted from solution using ethers such as diethyl ether or diisopropyl ether as the extracting agent.

It has proved to be particularly advantageous to use alkanols containing 4 or 5 carbon atoms, especially n-butanol, as the extracting agent. Such usage avoids difficulties attributable to resinification products. Another procedure involves a preliminary stage extraction with an alkanol followed by extraction with an ether.

It can be advantageous to pretreat the acidified solution by filtering or by passing it over an active auxiliary substance such as active carbon or fuller's earth.

The following examples serve to illustrate the present invention.

EXAMPLE 1

6.4 kg. of o-chlorophenol (50 mols), 6.2 kg. of NaOH (150 mols), 62 g. of $CuSO_4 \cdot 5H_2O$ and 200 g. of $NaHSO_3$ were dissolved in water, giving a total volume of 100 litres. After heating, the pale blue solution was pumped, at a rate of 4 litres per hour, through a copper pressure tube kept at 190° C., providing a residence time of 3 hours. The reaction mixture obtained was acidified with 0.65 l./hour of 50% by weight sulphuric acid, and then extracted in countercurrent with n-butanol and worked up in the usual way. The chlorine conversion exceeded 95%. The pyrocatechol yield was approximately 84%. Approximately half of a residue obtained from the extract consisted of 2,2'-dihydroxydiphenyl ether.

EXAMPLE 2

12 litres of an aqueous solution containing 1100 g. of 92% pure 2-chloro-4-tert.-butylphenol (the remainder being p-tert.-butyl phenol), 750 g. of NaOH, 15 g. of $Na_2SO_3$ and 7.5 g. of $CuSO_4 \cdot 5H_2O$ were hydrolyzed at 190° C. in a silver autoclave. The reaction lasted 3 hours. The dark brown reaction mixture obtained was mixed with 4 litres of sec.-butanol while stirring in a glass vessel and acidified. Extraction was followed by working up through distillation. The yields were as follows:

|  | G. |
|---|---|
| Tert.-butyl pyrocatechol | 593 |
| p-Tert.-butyl phenol | 155 |
| Unreacted 2-chloro-4-tert.-butylphenol | 121 |
| Distillation residue | 130 |

EXAMPLE 3

6 litres of an aqueous solution containing 426 g. of 6-chloro-o-cresol, 365 g. of NaOH, 8.5 g. of hydrazine sulphate and 3 g. of $CuSO_4 \cdot 5H_2O$ were heated for 2 hours at 205° C. under nitrogen in a silver autoclave. After acidification, the reaction mixture was extracted with isobutanol. The following yields were obtained:

|  | G. |
|---|---|
| Isohomopyrocatechol | 221 |
| 6-chloro-o-cresol | 42 |
| o-Cresol | 38 |
| Distillation residue | 61 |

EXAMPLE 4

80 ml. of an aqueous solution containing 6.2 g. of 94% pure 6-chloro-o-ethylphenol (the remainder being o-ethylphenol), 5 g. of NaOH and 0.05 g. of $CuSO_4 \cdot 5H_2O$ were heated for 3 hours at 190° C. in a 100 ml. capacity silver-lined steel cylinder. After the reaction mixture had been acidified, it was extracted and found by gas chromatography to contain:

|  | Percent by weight |
|---|---|
| o-Ethylphenol | 10.5 |
| 3-ethylpyrocatechol | 76.8 |
| 2-chloro-6-ethylphenol | 12.7 |

EXAMPLE 5

80 ml. of a solution containing 7.3 g. of 2-chloro-4-sec.-butylphenol, 5 g. of NaOH and 0.05 g. of $CuSO_4 \cdot 5H_2O$ were hydrolyzed and worked up as in Example 4. The reaction mixture was found to contain:

|  | Percent by weight |
|---|---|
| p-Sec.-butylphenol | 6.9 |
| p-Sec.-butyl pyrocatechol | 78.2 |
| 2-chloro-4-sec.-butylphenol | 14.9 |

EXAMPLE 6

16 litres of an aqueous solution containing 256 g. of o-chlorophenol (2 mols), 768 g. of p-chlorophenol (6 mols), 440 g. of pyrocatechol, 960 g. of NaOH (24 mols), 6.8 g. of $CuCl_2 \cdot 2H_2O$ and 35 g. of $NaHSO_3$ were heated for 3 hours at 190° C. in a silver-plated autoclave. After cooling, the reaction mixture was acidified with 50% by weight $H_2SO_4$ and extracted with n-butanol. It was found to contain:

|  | G. |
|---|---|
| Dihydroxy benzenes | 1129 |
| Mixture of phenol and chlorophenols | 85 |
| Distillation residue | 56 |

The dihydroxybenzene fraction consisted of:

|  | Percent by weight |
|---|---|
| Hydroquinone | 52.0 |
| Pyrocatechol | 47.5 |
| p-Chlorophenol | 0.5 |

18 g. of 4,4'-dihydroxydiphenyl ether were isolated from the residue.

EXAMPLE 7

320 ml. of an aqueous solution containing 5.1 g. of o-chlorophenol, 20.5 g. of 2-chloro-4-n-propylphenol, 8.8 g. of pyrocatechol, 19.2 g. of NaOH and 0.2 g. of $CuSO_4 \cdot 5H_2O$, were hydrolyzed for 3 hours in a silver cylinder. The fraction, freed from unreacted starting materials and the residue after working up, consisted of:

|  | Percent by weight |
|---|---|
| Phenol | 2 |
| p-n-Propylphenol | 4 |
| Pyrocatechol | 43 |
| 4-n-propylpyrocatechol | 51 |

EXAMPLE 8

For an 85% chlorine conversion, the hydrolysis of 20.5 g. of o-chlorophenol, 5.7 g. of 4-chloro-o-cresol in the presence of 0.25 g. of $CuSO_4 \cdot 5H_2O$ at 180° C. gave a fraction in which the following were detected by gas chromatography:

|  | Percent by weight |
|---|---|
| Phenol | 5.0 |
| o-Cresol | 1.8 |
| o-Chlorophenol | 14.0 |
| Pyrocatechol | 65.5 |
| 4-chloro-o-cresol | 4.4 |
| Toluhydroquinone | 9.3 |

EXAMPLE 9

625 g. of 6-chloro-2,4-dimethylphenol, 520 g. of NaOH, 124 g. of isohomopyrocatechol and 5 g. of $CuSO_4 \cdot 5H_2O$ were dissolved in 7.5 litres of water. The solution was heated while stirring at 190° C., kept at this temperature for 3 hours, removed from the reactor after cooling to 60° C. and, following the addition of 2 litres of diisopropyl ether, was diluted while stirring with 50% by weight $H_2SO_4$. After working up, 314 g. of 3,5-dimethylpyrocatechol were obtained for a chlorine conversion of 90%.

EXAMPLE 10

300 ml. of an aqueous solution containing 11 g. of 6-chloro-m-cresol, 11 g. of 2-chloro-p-cresol, 12.5 g. of p-tert.-butylpyrocatechol, 20 g. of NaOH and 0.2 g. of $CuSO_4 \cdot 5H_2O$ were heated for 3 hours at 190° C. in a silver-plated shaker-type autoclave. After working up, the extract (30 g.) was found to have the following composition:

| | Percent by weight |
|---|---|
| m-Cresol | 2.2 |
| p-Cresol | 2.4 |
| 6-chloro-m-cresol | 4.3 |
| 2-chloro-p-cresol | 4.8 |
| Homopyrocatechol | 34.6 |
| Tert.-butylpyrocatechol | 51.7 |

EXAMPLE 11

Following the procedure of Example 8, 29.5 g. of 2-chloro-p-tert.-butylphenol and 5 g. of p-chlorophenol were hydrolyzed in the presence of 0.25 g. of $$CuSO_4.5H_2O$$

For a chlorine conversion of 72%, a chromatogram of the extract freed from the residue shows the following composition:

| | Percent by weight |
|---|---|
| Phenol | 0.8 |
| p-Tert.-butylphenol | 4.1 |
| p-Chlorophenol | 5.4 |
| Hydroquinone | 9.2 |
| p-Tert.-butylpyrocatechol | 55.2 |
| 2-chloro-p-tert.-butylphenol | 25.3 |

What is claimed is:

1. A process which comprises hydrolyzing an aqueous solution of o-chlorophenol, lower alkyl substituted o-chlorophenol, p-chlorophenol, lower alkyl substituted p-chlorophenol or a mixture thereof at a concentration of 0.1 to 1 mol/liter with a stoichiometric amount of a 0.2 to 3.5 normal sodium hydroxide solution in the presence of (a) 0.1 to 0.25 g./liter of copper in metallic form, $CuSO_4$ or $CuCl_2$, and (b) a reducing agent selected from the group consisting of sodium sulphite, sodium hydrogen sulphite and hydrazine sulphate in an amount of from 0.1 to 10 g./liter at a temperature of from 160 to 250° C., acidifying resulting reaction mixture and recovering dihydroxybenzene product.

2. The process of claim 1 wherein 1.5 to 2.0 normal sodium hydroxide solution is employed.

3. The process of claim 1 wherein said aqueous solution contains a member selected from the group consisting of o-chlorophenol, 3-methyl-o-chlorophenol, 6-methyl-o-chlorophenol and 4-tert.butyl-o-chlorophenol.

4. The process of claim 1 wherein said aqueous solution contains not more than 30 mol percent of p-chlorophenol or lower alkyl substituted p-chlorophenol in admixture with o-chlorophenol or lower alkyl substituted o-chlorophenol.

5. The process of claim 1 wherein a catalyst activator selected from the group consisting of pyrocatechol, 3-methyl pyrocatechol or p-tert.-butyl pyrocatechol is present in said aqueous solution.

References Cited
UNITED STATES PATENTS

| 3,536,767 | 10/1970 | Sommerfield | 260—629 |
| 3,413,341 | 11/1968 | Bursack et al. | 260—629 X |
| 3,301,908 | 1/1967 | Ebach et al. | 260—629 X |
| 3,234,291 | 2/1966 | Kelly | 260—629 |
| 3,213,146 | 11/1965 | Prahl et al. | 260—629 |

LEON ZITVER, Primary Examiner

N. MORGENSTERN, Assistant Examiner

U.S. Cl. X.R.

260—625, 629